United States Patent
Ou-Yang et al.

(10) Patent No.: US 12,223,698 B2
(45) Date of Patent: Feb. 11, 2025

(54) METHOD FOR SEARCHING A PATH BY USING A THREE-DIMENSIONAL RECONSTRUCTED MAP

(71) Applicant: NATIONAL YANG MING CHIAO TUNG UNIVERSITY, Hsinchu (TW)

(72) Inventors: Mang Ou-Yang, Hsinchu (TW); Yung-Jhe Yan, Taipei (TW); Ming-Da Jiang, Dalin Township (TW); Ta-Fu Hsu, Taoyuan (TW); Shao-Chun Yeh, Taoyuan (TW); Kun-Hsiang Chen, Kaohsiung (TW); Tzung-Cheng Chen, Tainan (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 327 days.

(21) Appl. No.: 17/825,503

(22) Filed: May 26, 2022

(65) Prior Publication Data
US 2023/0267717 A1    Aug. 24, 2023

(51) Int. Cl.
*G06V 10/82* (2022.01)
*B64C 39/02* (2023.01)
(Continued)

(52) U.S. Cl.
CPC .......... *G06V 10/803* (2022.01); *B64C 39/024* (2013.01); *G01C 21/005* (2013.01);
(Continued)

(58) Field of Classification Search
None
See application file for complete search history.

(56) References Cited

U.S. PATENT DOCUMENTS

2016/0125740 A1 * 5/2016 Pasko ............... G08G 5/0034
701/528
2016/0300495 A1 * 10/2016 Kantor ............... H04L 61/5007
(Continued)

FOREIGN PATENT DOCUMENTS

CN     112762957 B  * 12/2022  ............. G01C 11/00
CN     111928862 B  * 11/2023  ............. G01C 21/32
(Continued)

OTHER PUBLICATIONS

Z. Zheng, T. R. Bewley and F. Kuester, "Point Cloud-Based Target-Oriented 3D Path Planning for UAVs," 2020 International Conference on Unmanned Aircraft Systems (ICUAS), 2020, pp. 790-798, doi: 10.1109/ICUAS48674.2020.9213894.
(Continued)

*Primary Examiner* — Redhwan K Mawari
*Assistant Examiner* — Kai Nmn Wang
(74) *Attorney, Agent, or Firm* — Rosenberg, Klein & Lee

(57) ABSTRACT

A method for searching a path by using a 3D reconstructed map includes: receiving 3D point-cloud map information and 3D material map information; clustering the 3D point-cloud map information with a clustering algorithm to obtain clustering information, and identifying material attributes of objects in the 3D point-cloud map information with a material neural network model to obtain material attribute information; fusing the those map information based on their coordinate information, thereby outputting fused map information; identifying obstacle areas and non-obstacle areas in the fused map information based on an obstacle neural network model, the clustering information, and the material attribute information; and generating 3D path information according to the non-obstacle areas. Since the 3D path information is generated based on those map information,
(Continued)

the obstacle areas and flight spaces are effectively determined to generate an accurate flight path.

9 Claims, 3 Drawing Sheets

(51) Int. Cl.
    *G01C 21/00* (2006.01)
    *G05D 1/00* (2006.01)
    *G06V 10/56* (2022.01)
    *G06V 10/762* (2022.01)
    *G06V 10/80* (2022.01)
    *G06V 20/58* (2022.01)
    *G08G 5/00* (2006.01)

(52) U.S. Cl.
    CPC .............. *G05D 1/106* (2019.05); *G06V 10/56* (2022.01); *G06V 10/762* (2022.01); *G06V 10/82* (2022.01); *G06V 20/58* (2022.01); *G08G 5/003* (2013.01); *G08G 5/0069* (2013.01); *B64U 2201/10* (2023.01)

(56) References Cited

U.S. PATENT DOCUMENTS

| | | | | |
|---|---|---|---|---|
| 2018/0003656 | A1* | 1/2018 | Michini | G01N 25/72 |
| 2019/0101935 | A1* | 4/2019 | Lai | G05B 23/0289 |
| 2019/0144116 | A1* | 5/2019 | Yuan | B64U 50/19 |
| | | | | 701/3 |
| 2020/0241571 | A1* | 7/2020 | Torii | B64C 13/20 |
| 2021/0058653 | A1* | 2/2021 | Jang | G06T 3/4053 |
| 2021/0201145 | A1* | 7/2021 | Pham | G06N 3/08 |
| 2021/0390331 | A1* | 12/2021 | Kellner | G01S 15/66 |
| 2021/0403159 | A1* | 12/2021 | Dey | G08G 5/0021 |
| 2022/0212789 | A1* | 7/2022 | Lisoski | G05D 1/0204 |
| 2022/0332349 | A1* | 10/2022 | Benou | G01C 21/20 |
| 2023/0136860 | A1* | 5/2023 | Wang | G06V 20/58 |
| | | | | 345/419 |

FOREIGN PATENT DOCUMENTS

| | | | |
|---|---|---|---|
| TW | I532619 B | | 5/2016 |
| TW | I623913 B | | 5/2018 |
| WO | WO-2021217352 A1 | * | 11/2021 |

OTHER PUBLICATIONS

F. Gao and S. Shen, "Online quadrotor trajectory generation and autonomous navigation on point clouds," 2016 IEEE International Symposium on Safety, Security, and Rescue Robotics (SSRR), 2016, pp. 139-146, doi: 10.1109/SSRR.2016.7784290.

* cited by examiner

METHOD FOR SEARCHING A PATH BY USING A THREE-DIMENSIONAL RECONSTRUCTED MAP

This application claims priority of application No. 111106361 filed in Taiwan on 22 Feb. 2022 under 35 U.S.C. § 119; the entire contents of all of which are hereby incorporated by reference.

BACKGROUND OF THE INVENTION

Field of the Invention

The present invention relates to a technology for generating a path for a mobile vehicle, particularly to a method for searching a path by using a three-dimensional reconstructed map, wherein the method is applied to path planning for an unmanned aerial vehicle.

Description of the Related Art

An unmanned aerial vehicle is broadly defined as a vehicle that does not require a driver to board the aircraft. The vehicle can drive automatically. Alternatively, the vehicle can be remotely controlled. Unmanned aerial vehicles are often used for scientific research, site exploration, military, agricultural, aerial photography, or other fields.

The following examples of references that generate automatic driving paths are introduced as follows. In reference 1 "Online Quadrotor Trajectory Generation and Autonomous Navigation on Point Clouds" by F. Gao and S. Shen, IEEE International Symposium on Safety, Security, and Rescue Robotics (SSRR), pages 139-146, 2016, a method for generating an obstacle-avoidance flight path of an unmanned aerial vehicle based on three-dimensional (3D) point-cloud map information is proposed. Reference 1 directly computes the flight path of the unmanned aerial vehicle in an environment based on the 3D point-cloud map information, a rapidly exploring graphical method, and an A* search algorithm. However, reference 1 does not have three-dimensional point-cloud attribute information. Thus, when the map information is updated every time, the data structure of the point cloud information must be rebuilt, which affects the flight performance and success rate.

In reference 2 "Point Cloud-Based Target-Oriented 3D Path Planning for UAVs" by Z. Zheng, T. R. Bewley and F. Kuester, 2020 International Conference on Unmanned Aircraft Systems (ICUAS), pages 790-798, 2020, a method for planning a three-dimensional path of an unmanned aerial vehicle based on three-dimensional (3D) point-cloud map information is proposed. Reference 2 analyzes the three-dimensional point-cloud map information of a target environment, uses an improved rapidly exploring random tree (RRT) path algorithm, and plans a three-dimensional path for the unmanned aerial vehicle based on the data structure of a k-dimensional (k-d) tree and obstacle-avoidance strategies.

However, reference 2 determines obstacles only based on the three-dimensional point-cloud map information. Thus, reference 2 does not effectively determine the material attributes of objects in the field, such as the material attributes of trees, lands, or stones. As a result, reference 2 does not effectively determine obstacles in the field or classify objects in the point-cloud map. Instead, the unmanned aerial vehicle needs to be equipped with additional sensors in order to more precisely determine obstacles and achieve a better obstacle-avoidance effect.

To overcome the abovementioned problems, the present invention provides a method for searching a path by using a three-dimensional reconstructed map, so as to solve the afore-mentioned problems of the prior art.

SUMMARY OF THE INVENTION

The primary objective of the present invention is to provide a method for searching a path by using a three-dimensional reconstructed map, which effectively determines obstacle areas and flight spaces based on three-dimensional point-cloud map information and three-dimensional material map information to generate an accurate flight path. Thus, an unmanned aerial vehicle flies in a smaller space to improve the precision of flight and the success rate of obstacle avoidance, and the size of the unmanned aerial vehicle can be made smaller.

Another objective of the present invention is to provide a method for searching a path by using a three-dimensional reconstructed map, which adjusts three-dimensional path information according to wind-level parameters to provide an optimized flight path.

Further objective of the present invention is to provide a method for searching a path by using a three-dimensional reconstructed map, which reduces the number of parameters required for generating a flight path with sensors and the size and weight of an unmanned aerial vehicle, so as to improve flight performance and decrease the production cost of the unmanned aerial vehicle.

In order to achieve the foregoing objectives, the present invention provides a method for searching a path by using a three-dimensional includes: receiving three-dimensional reconstructed map, which point-cloud map information and three-dimensional material map information; clustering the three-dimensional point-cloud map information with a clustering algorithm to obtain clustering information, and identifying material attributes of objects in the three-dimensional point-cloud map information with a material neural network model to obtain material attribute information; retrieving coordinate information of the three-dimensional point-cloud map information and the three-dimensional material map information, and fusing the three-dimensional point-cloud map information and the three-dimensional material map information based on the coordinate information, thereby outputting fused map information; identifying obstacle areas and non-obstacle areas in the fused map information based on an obstacle neural network model, the clustering information, and the material attribute information; and generating three-dimensional path information according to the non-obstacle areas.

In an embodiment of the present invention, the three-dimensional path information comprises path points connected with each other, and the path points keep distance where an obstacle-avoidance circle is formed from the obstacle areas.

In an embodiment of the present invention, after the step of generating the three-dimensional path information, inputting wind information and determining whether the wind information is greater than a wind-level threshold or determining whether a headwind occurs based on the wind information: if yes, decreasing the distance of the obstacle-avoidance circle and positions in a z axis of the three-dimensional path information to generate first three-dimensional path information; and if no, increasing the distance of the obstacle-avoidance circle to generate second three-dimensional path information.

In an embodiment of the present invention, the non-obstacle area is at least 0.5 m from the obstacle area.

In an embodiment of the present invention, the material attributes are color attributes.

In an embodiment of the present invention, the three-dimensional point-cloud map information is three-dimensional lidar point-cloud map information, and the three-dimensional material map information is three-dimensional image information.

Below, the embodiments are described in detail in cooperation with the drawings to make easily understood the technical contents, characteristics and accomplishments of the present invention.

DETAILED DESCRIPTION OF THE INVENTION

The present invention provides a method for searching a path by using a three-dimensional reconstructed map, which is applied to a computer system. The method is loaded and performed by a computer to compute the flight path of an unmanned aerial vehicle, thereby controlling the unmanned aerial vehicle. Thus, the unmanned aerial vehicle can drive automatically.

Figure 1:
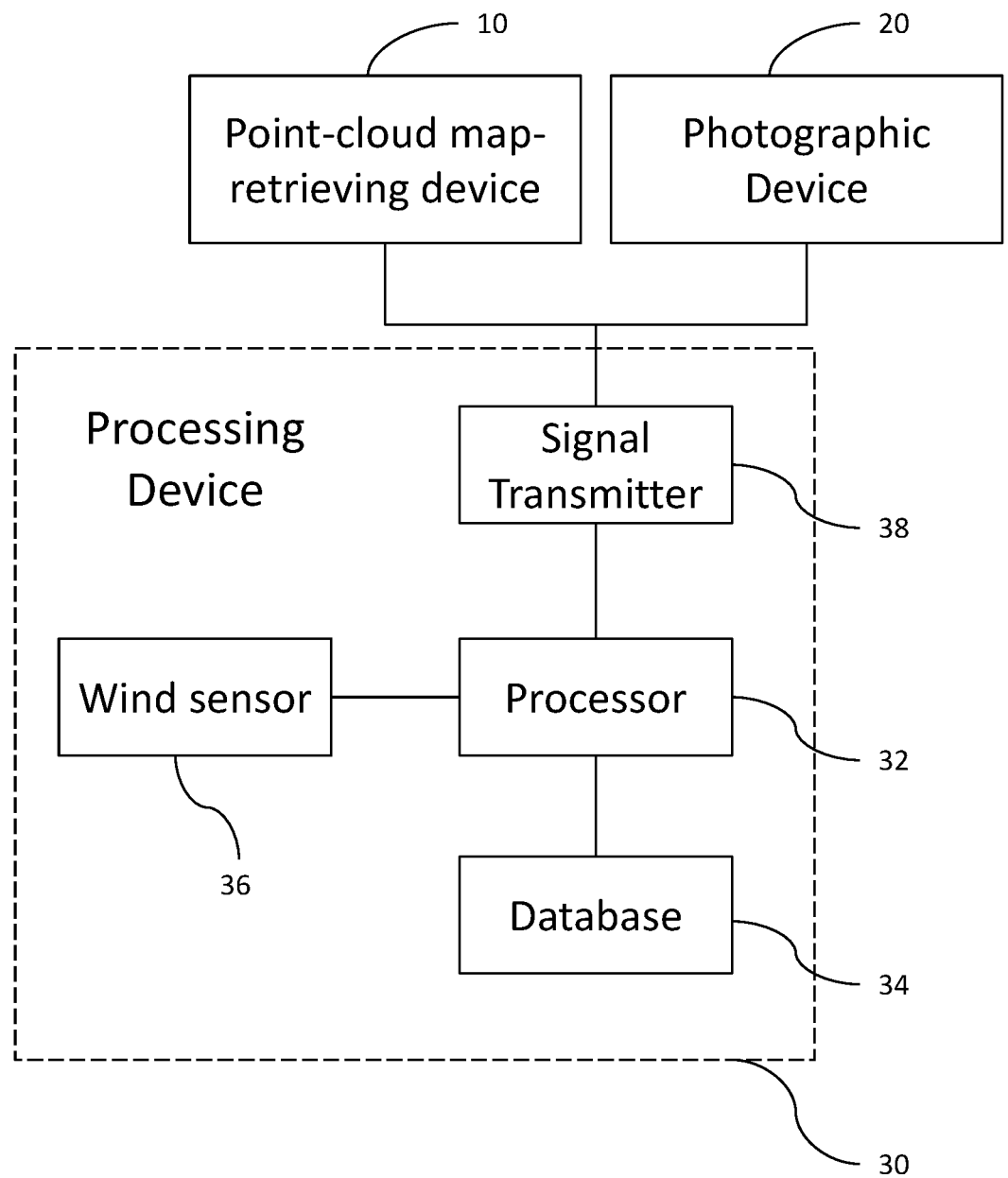
FIG. 1 is a schematic diagram illustrating a system using a method for searching a path by using a three-dimensional reconstructed map of the present invention.

Before computing the flight path, environment information is retrieved by devices to build a three-dimensional map model in an environment. Referring to FIG. 1, the devices for retrieving the environment information include a point-cloud map-retrieving device 10 and a photographic device 20. The point-cloud map-retrieving device 10 is configured to generate three-dimensional point-cloud map information.

In the embodiment, the point-cloud map-retrieving device 10 is a lidar and the three-dimensional point-cloud map information is three-dimensional lidar point-cloud map information. The point-cloud map-retrieving device 10 emits lidar signals to the environment, detects distance data points according to the lidar signals, and combines the distance data points into the three-dimensional point-cloud map information according to the actual coordinates of the distance data points.

The photographic device 20 is configured to generate three-dimensional material map information. In the embodiment, the photographic device 20 is a camera and the three-dimensional material map information is three-dimensional image information. The photographic device 20 provides image for capturing the environment and combines the images into the three-dimensional material map information.

After collecting the three-dimensional point-cloud map information and the three-dimensional material map information, the point-cloud map-retrieving device 10 and the photographic device 20 provide them for a processing device 30. The processing device 30 computes the flight path of the unmanned aerial vehicle.

The processing device 30 is installed on the unmanned aerial vehicle (not illustrated). In the embodiment, the processing device 30 includes a processor 32, a database 34, a wind sensor 36, and a signal transmitter 38. The processor 32 is a computation device, such as a central processing unit (CPU). The processor can load the method for searching a path by using a three-dimensional reconstructed map and compute the flight path of the unmanned aerial vehicle, thereby generating three-dimensional path information. The database 34 is coupled to the processor 32. The database 34 may be a storage device, such as a memory or a hard disk. The wind sensor 36 is coupled to the processor 32 and configured to sense the level of wind to generate wind information. The processor 32 receives the wind information. The signal transmitter 38 is coupled to the processor 32. The signal transmitter 38 may be a network transceiver or a data transmission interface such as a universal serial bus (USB). The signal transmitter 38 is configured to receive external information, such as the three-dimensional point-cloud map information, the three-dimensional material map information, etc.

After generating the three-dimensional point-cloud map information and the three-dimensional material map information, the point-cloud map-retrieving device 10 and the photographic device 20 transmit them to the processing device 30. The point-cloud map-retrieving device 10 and the photographic device 20 transmit the three-dimensional point-cloud map information and the three-dimensional material map information to the processor 32 through the signal transmitter 38, such that the processor 32 computes the three-dimensional path information with the method of the present invention. After receiving the three-dimensional point-cloud map information and the three-dimensional material map information, the processor 32 stores them into the database 34. When the waypoint is changed later and the flight path is recalculated by the processor 32, the three-dimensional point-cloud map information and the three-dimensional material map information in the database 34 can be used.

Figure 2:
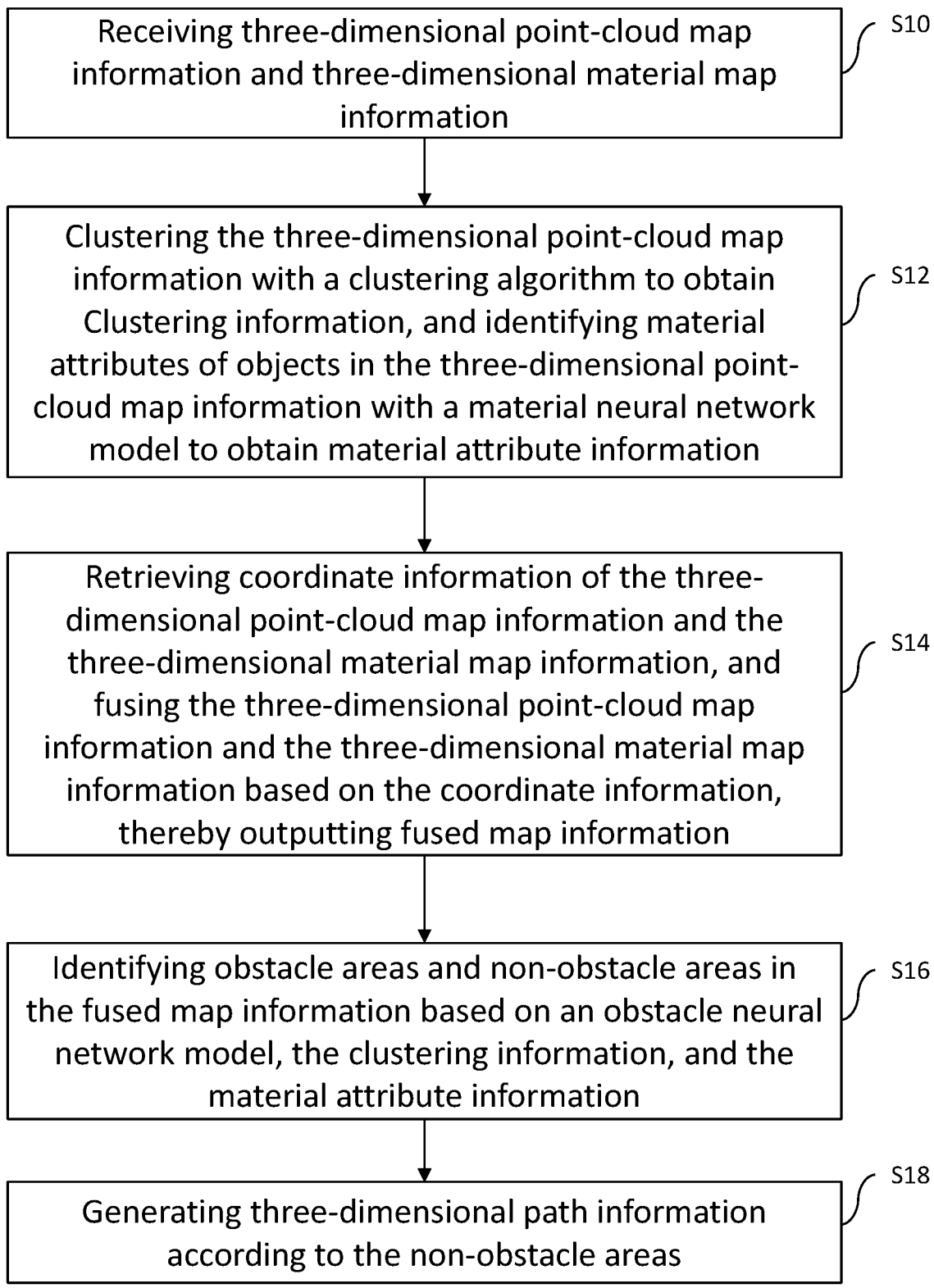
FIG. 2 is a flowchart of a method for searching a path by using a three-dimensional reconstructed map of the present invention.

After describing how to obtain the three-dimensional point-cloud map information and the three-dimensional material map information and the system using the method of the present invention, the method for searching a path by using a three-dimensional reconstructed map is described in detail. Referring to FIG. 1 and FIG. 2, in Step S10, the processor 30 receives the three-dimensional point-cloud map information generated by the point-cloud map-retrieving device 10 and the three-dimensional material map information generated by the photographic device 20.

In Step S12, the processing device 30 clusters the three-dimensional point-cloud map information with a clustering algorithm to obtain clustering information, thereby presenting and identifying obstacle areas in the future. In the embodiment, the clustering algorithm is density-based spatial clustering of applications with noise (DBSCAN). Simultaneously, the processing device 30 identifies material attributes of objects in the three-dimensional point-cloud map information with a material neural network model to obtain material attribute information. The material neural network model is pre-trained using historical data of material attributes of different objects. For example, image data of obstacles such as trees and stones are inputted to the material neural network model in advance. The image data are used to train the material neural network model to effectively identify material attributes of objects in the three-dimensional material map information, thereby identifying the obstacle areas in the future. The material is identified based on the color of the image. The material attributes can also be regarded as color attributes.

In Step S14, the processing device 30 retrieves the coordinate information of the three-dimensional point-cloud map information and the three-dimensional material map information, and fuses the three-dimensional point-cloud map information and the three-dimensional material map information based on the coordinate information, thereby outputting fused map information. The fused map information apparently presents the clustering information and the material attributes of all objects, thereby identifying the obstacle areas.

In Step S16, the processing device 30 identifies obstacle areas and non-obstacle areas in the fused map information based on an obstacle neural network model, the clustering information, and the material attribute information. The obstacle neural network model is pre-trained using historical data of material attribute information and clustering information of different obstacle areas. For example, the point-cloud map-retrieving device 10 and the photographic device 20 obtained the three-dimensional point-cloud map information and the three-dimensional material map information of obstacles such as trees and stones in the past. The point-cloud map-retrieving device 10 and the photographic device 20 calculate the historical parameters of the obstacles, including those of clustering information and material attribute information. The historical parameters of the obstacles are inputted to the obstacle neural network model for training. Hence, the obstacle neural network can identify the obstacle areas. The remaining unidentifiable non-attribute areas can be regarded as non-obstacle areas.

In Step S18, the processing device 30 obtains the obstacle areas and the non-obstacle areas in the fused map information. The processing device can set a destined waypoint and generate three-dimensional path information according to the non-obstacle areas. The three-dimensional path information, including values in the X axis, the Y axis, and the Z axis of a three-dimensional coordinate system in actual space, is used to control the movement of the unmanned aerial vehicle in three-dimensional actual space. The three-dimensional path information comprises path points connected with each other. The path points keep distance where an obstacle-avoidance circle is formed from the obstacle areas. As a result, there is a space barrier between the unmanned aerial vehicle and the obstacle in the embodiment. In other words, the unmanned aerial vehicle may have an obstacle-avoidance circle with a radius of 2 m. The unmanned aerial vehicle is 2 m from the obstacle. The foregoing condition needs to be considered when the three-dimensional path information is planned. The path will not be generated in the obstacle-avoidance circle if there is an obstacle within the obstacle-avoidance circle with a radius of 2 m.

Figure 3:
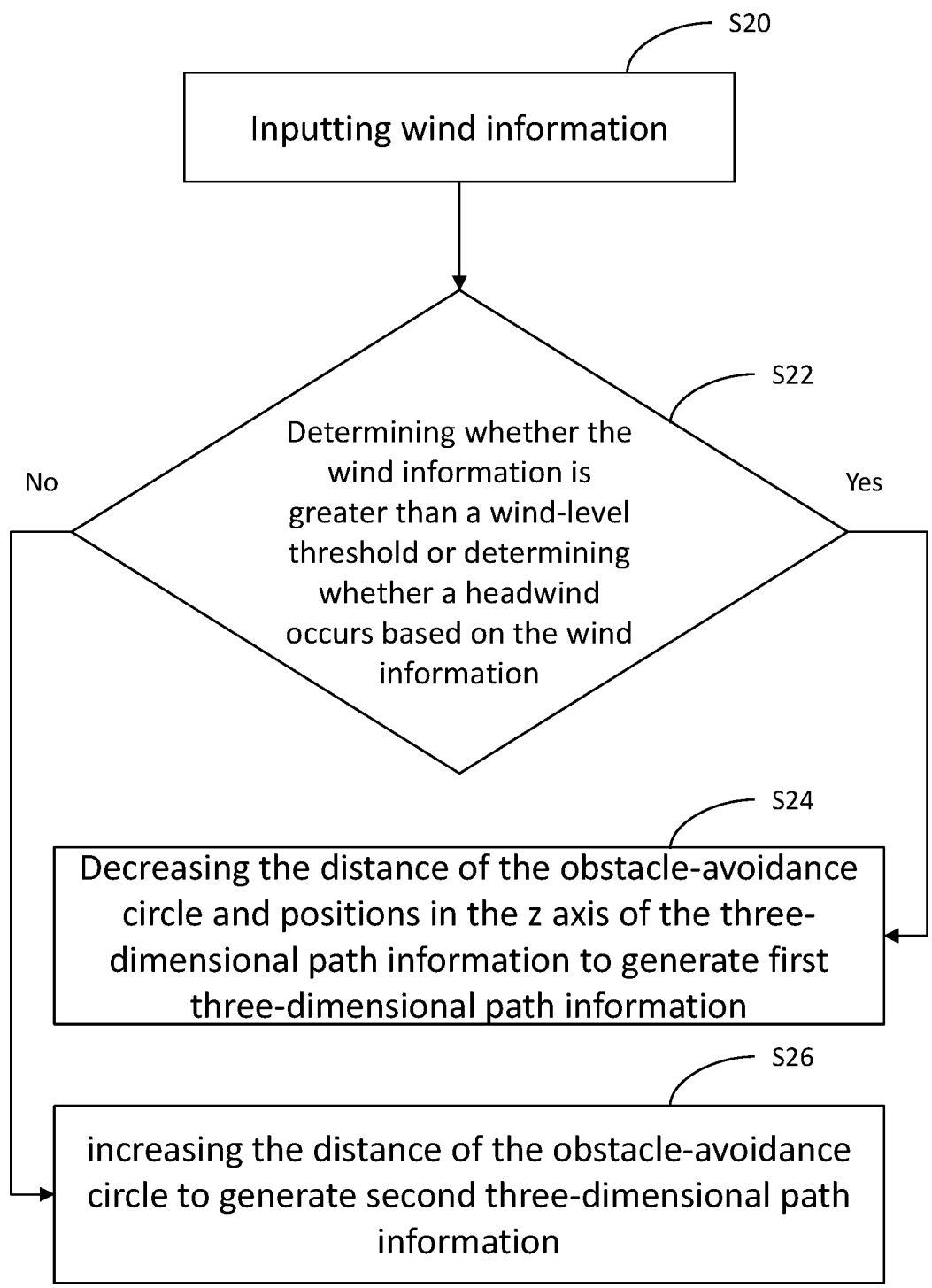
FIG. 3 is a flowchart of using wind parameters to adjust three-dimensional path information of the present invention.

In addition to directly generating the three-dimensional path information of the unmanned aerial vehicle, the embodiment further generates parameters for adjusting the three-dimensional path information. Specifically, the processor 32 is coupled to a wind sensor 36 for generating wind information. The wind information is used as parameters for adjusting the three-dimensional path information of the unmanned aerial vehicle. The wind information is used to adjust the radius of the obstacle-avoidance circle and the flight height. Referring to FIG. 1 and FIG. 3, in Step S20, the wind sensor 36 inputs the wind information to the processor 32. In Step S22, the processor 32 determines whether the wind information is greater than a wind-level threshold or determines whether a headwind occurs based on the wind information. When the processor 32 determines whether the headwind occurs, the wind sensor 36 detects and transmits the direction of wind to the processor 32. If the driving direction of the unmanned aerial vehicle is opposite to the direction of wind, the headwind occurs. When the processor 32 determines that the wind information is greater than the wind-level threshold or that the headwind occurs, the procedure proceeds to Step S24. In Step S24, the distance of the obstacle-avoidance circle is decreased. That is to say, the radius of the obstacle-avoidance circle is decreased, such that the unmanned aerial vehicle is closer to the obstacle when the unmanned aerial vehicle flies. Simultaneously, positions in the z axis of the three-dimensional path information are decreased to generate first three-dimensional path information. In the embodiment, the distance of the obstacle-avoidance circle is decreased by at most 0.7 m. The positions in the z axis of the three-dimensional path information are decreased by 0.5~2 m. When the processor 32 determines that the wind information is not greater than the wind-level threshold or that the headwind does not occur, the procedure proceeds to Step S26. In Step S26, the distance of the obstacle-avoidance circle is increased to generate second three-dimensional path information. That is to say, the radius of the obstacle-avoidance circle is increased, such that the unmanned aerial vehicle is farther away from the obstacle when the unmanned aerial vehicle flies. The distance of the obstacle-avoidance circle is increased by at most 0.5 m.

In conclusion, the present invention effectively determines obstacle areas and flight spaces based on three-dimensional point-cloud map information and three-dimensional material map information to generate an accurate flight path. Thus, an unmanned aerial vehicle flies in a smaller space to improve the precision of flight and the success rate of obstacle avoidance, and the size of the unmanned aerial vehicle can be made smaller. The present invention adjusts the three-dimensional path information according to wind-level parameters to provide an optimized flight path. The present invention reduces the number of parameters required for generating a flight path with sensors and the size and weight of the unmanned aerial vehicle, so as to improve flight performance and decrease the production cost of the unmanned aerial vehicle.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for searching a path by using a three-dimensional reconstructed map comprising:
   using a point-cloud map-retrieving device to emit lidar signals to environment, detect distance data points according to the lidar signals, and combine the distance data points into three-dimensional point-cloud map information according to actual coordinates of the distance data points;
   using a processor to perform the following steps:
   receiving the three-dimensional point-cloud map information and three-dimensional material map information;
   clustering the three-dimensional point-cloud map information with a clustering algorithm to obtain clustering information, and identifying material attributes of objects in the three-dimensional point-cloud map information with a material neural network model to obtain material attribute information;

retrieving coordinate information of the three-dimensional point-cloud map information and the three-dimensional material map information, and fusing the three-dimensional point-cloud map information and the three-dimensional material map information based on the coordinate information, thereby outputting fused map information;

identifying obstacle areas and non-obstacle areas in the fused map information based on an obstacle neural network model, the clustering information, and the material attribute information;

generating three-dimensional path information according to the non-obstacle areas, wherein the three-dimensional path information comprises path points connected with each other, and the path points keep a distance where an obstacle-avoidance circle is formed from the obstacle areas, the distance is used as the radius of the obstacle-avoidance circle; and inputting wind information and determining whether the wind information is greater than a wind-level threshold or determining whether a headwind occurs based on the wind information, wherein a wind sensor is coupled to the processor generating the wind information:

if yes, decreasing the radius of the obstacle-avoidance circle and a position in a z axis of the three-dimensional path information to generate first three-dimensional path information, wherein the position is unmanned aerial vehicle's position in the z axis of the three-dimensional path information; and if no, increasing the radius of the obstacle-avoidance circle to generate second three-dimensional path information.

2. The method for searching a path by using a three-dimensional reconstructed map according to claim 1, wherein the radius of the obstacle-avoidance circle is decreased by at most 0.7 m, and the radius of the obstacle-avoidance circle is increased by at most 0.5 m.

3. The method for searching a path by using a three-dimensional reconstructed map according to claim 1, wherein the positions in the z axis of the three-dimensional path information are decreased by 0.5~2 m.

4. The method for searching a path by using a three-dimensional reconstructed map according to claim 1, wherein the non-obstacle area is at least 0.5 m from the obstacle area.

5. The method for searching a path by using a three-dimensional reconstructed map according to claim 1, wherein the material neural network model is pre-trained using historical data of material attributes of different objects.

6. The method for searching a path by using a three-dimensional reconstructed map according to claim 5, wherein the material attributes are color attributes.

7. The method for searching a path by using a three-dimensional reconstructed map according to claim 1, wherein the obstacle neural network model is pre-trained using historical data of material attribute information and clustering information of different obstacle areas.

8. The method for searching a path by using a three-dimensional reconstructed map according to claim 1, wherein the clustering algorithm is density-based spatial clustering of applications with noise (DBSCAN).

9. The method for searching a path by using a three-dimensional reconstructed map according to claim 1, wherein the three-dimensional point-cloud map information is three-dimensional lidar point-cloud map information, and the three-dimensional material map information is three-dimensional image information.

* * * * *